United States Patent
Yoon et al.

(10) Patent No.: US 9,563,853 B2
(45) Date of Patent: Feb. 7, 2017

(54) EFFICIENT INFORMATION RECONCILIATION METHOD USING TURBO CODES OVER THE QUANTUM CHANNEL

(71) Applicant: KOREA UNIVERSITY RESEARCH AND BUSINESS FOUNDATION, Seoul (KR)

(72) Inventors: Sung-sik Yoon, Seoul (KR); Jun Heo, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 169 days.

(21) Appl. No.: 14/515,296

(22) Filed: Oct. 15, 2014

(65) Prior Publication Data
US 2015/0214978 A1 Jul. 30, 2015

(30) Foreign Application Priority Data
Jan. 24, 2014 (KR) ........................ 10-2014-0008851

(51) Int. Cl.
 *G06N 99/00* (2010.01)
 *H04L 1/00* (2006.01)
 (Continued)

(52) U.S. Cl.
 CPC ............ *G06N 99/002* (2013.01); *G06N 3/084* (2013.01); *H03M 13/095* (2013.01);
 (Continued)

(58) Field of Classification Search
CPC .. G06N 99/002; G06N 3/084; H03M 13/2957; H03M 13/1102; H03M 13/1151; H03M 13/095; H04L 1/0064; H04L 1/1819; H04L 9/0852; H04L 9/0858; H04L 9/0861; H04L 9/0869; H04L 63/06; H04L 2209/34
(Continued)

(56) References Cited

U.S. PATENT DOCUMENTS 7,461,323 B2 * 12/2008 Matsumoto ......... H03M 13/095
  713/150
7,587,654 B2 * 9/2009 Matsumoto ........... H04L 1/0057
  713/150
(Continued)

FOREIGN PATENT DOCUMENTS

KR 1020060113770 11/2006

OTHER PUBLICATIONS

Johnson, An Analysis of Error Reconciliation Protocols for Use in Quantum Key Distribution, Feb. 2012, Air Force Institute of Technology, pp. iv, 1-165.*

(Continued)

*Primary Examiner* — John J Tabone, Jr.
(74) *Attorney, Agent, or Firm* — Duane Morris LLP; J. Rodman Steele, Jr.; Gregory M. Lefkowitz

(57) ABSTRACT

Provided is an information reconciliation method in a quantum key distribution system between a transmitter and a receiver, which includes receiving a parity bit from the transmitter through a quantum channel, correcting an error of a receiver quantum key by using the received parity bit, and removing a residual error of the receiver quantum key through an open channel by using a cascade protocol to harmonize the receiver quantum key with a transmitter quantum key, wherein the parity bit is generated at the transmitter by using turbo codes. This method may enhance quantum key generation efficiency.

7 Claims, 6 Drawing Sheets

(51) Int. Cl.

| | | |
|---|---|---|
| *G06N 3/08* | (2006.01) | |
| *H04L 9/08* | (2006.01) | |
| *H04L 1/18* | (2006.01) | |
| *H03M 13/11* | (2006.01) | |
| *H04L 29/06* | (2006.01) | |
| *H03M 13/09* | (2006.01) | |
| *H03M 13/29* | (2006.01) | |

(52) U.S. Cl.
CPC .... *H03M 13/1102* (2013.01); *H03M 13/1151* (2013.01); *H03M 13/2957* (2013.01); *H04L 1/0064* (2013.01); *H04L 1/1819* (2013.01); *H04L 9/0852* (2013.01); *H04L 9/0858* (2013.01); *H04L 9/0861* (2013.01); *H04L 9/0869* (2013.01); *H04L 63/06* (2013.01); *H04L 2209/34* (2013.01)

(58) Field of Classification Search
USPC 714/755, 752, 758, 786, 821, 712; 380/277, 278, 46; 713/168, 171
See application file for complete search history.

(56) References Cited

U.S. PATENT DOCUMENTS

| | | | | |
|---|---|---|---|---|
| 7,609,839 B2* | 10/2009 | Watanabe | ............. | H04L 9/0858 380/255 |
| 7,734,757 B2* | 6/2010 | Maeda | ................. | H04L 9/0858 380/277 |
| 7,881,472 B2* | 2/2011 | Matsumoto | ........ | H03M 13/1102 380/260 |
| 2006/0059403 A1* | 3/2006 | Watanabe | ............. | H04L 9/0858 714/758 |
| 2006/0093143 A1* | 5/2006 | Maeda | ................. | H04L 9/0852 380/256 |
| 2006/0262925 A1* | 11/2006 | Matsumoto | ......... | H03M 13/095 380/28 |
| 2007/0058810 A1* | 3/2007 | Tanaka | ................. | H04L 9/0852 380/210 |
| 2008/0144833 A1* | 6/2008 | Matsumoto | ........ | H03M 13/1102 380/278 |
| 2008/0222487 A1* | 9/2008 | Matsumoto | ........... | H04L 1/0057 714/758 |
| 2009/0169015 A1* | 7/2009 | Watanabe | ............. | H04L 9/0858 380/278 |
| 2013/0315395 A1* | 11/2013 | Jacobs | ................. | H04L 9/0852 380/278 |
| 2015/0188701 A1* | 7/2015 | Nordholt | ............... | H04L 9/0852 713/171 |
| 2015/0195087 A1* | 7/2015 | Doi | ....................... | H04L 9/0858 380/278 |

OTHER PUBLICATIONS

C. Berrou, A. Glavieux, P. Thitimajshima, "Near shannon limit error—correcting coding and decoding: Turbo-codes(1)", In proc. IEEE Int'l Conf. on computers, pp. 1064-1070, May 1993.

C.H. Bennett and G. Brassard, "Quantum cryptography: Public key distribution and coin tossing," in Proc. IEEE Int'l Conf. on Computers, Systems and Signal, 1984, pp. 175-179.

G. Brassard, L. Salvail, "Secret key reconciliation by public discussion," in Proc. Eurocypt '93, 1994, pp. 410-423.

W. T. Buttler, S. K. Lamoreaux, J. R. Torgerson, G. H. Nickel, C. H. Donahue, and C. G. Peterson, "Fast, efficient error reconciliation for quantum cryptography," Phys. Rev. A, vol. 67, No. 052303, pp. 1-8, May 2003.

A.D. Liveris, Z. Xiong, and C.N. Georghiades, "Compression of binary sources with side information at the decoder using LDPC codes," IEEE Commun, Lett., vol. 6, No. 10, pp. 440-442, Oct. 2002.

W.Y. Hwang, I.G. Koh, and Y.D. Han, "Quantum cryptography without announcement of bases," Phys. Lett. A, vol. 224, pp. 489-494, Aug. 2003.

* cited by examiner

EFFICIENT INFORMATION RECONCILIATION METHOD USING TURBO CODES OVER THE QUANTUM CHANNEL

CROSS-REFERENCE TO RELATED APPLICATIONS

This application claims priority under 35 U.S.C. §119 to Korean Patent Application No. 10-2014-0008851 filed on Jan. 24, 2014 in the Korean Intellectual Property Office, the disclosure of which is incorporated herein by reference in its entirety.

TECHNICAL FIELD

The following disclosure relates to an information reconciliation method of a quantum key system, and in particular, to an information reconciliation method using turbo codes over a quantum channel.

BACKGROUND

The quantum key distribution theory is to distribute a security key by using two channels, namely a quantum channel and an open channel, and is performed using four processes: quantum transmission, information reconciliation, privacy amplification, and proof. In the quantum transmission process, a security key in a photon form is transmitted through a quantum channel. In this state, a transmitter and a receiver may detect wire-tapping of a pirate listener to minimize his/her influence, and the receiver receives a quantum key influenced by a quantum channel error rate. In addition, the information reconciliation is performed through an open channel, and an error of the quantum key of the receiver is corrected to have the same binary bit sequence as a quantum key of the transmitter. The open channel is a non-error channel (noiseless channel) where no error occurs and is assumed as a channel which cannot be maliciously influenced by a pirate listener. However, since all processes are performed in an open state, a pirate listener may also obtain information about the quantum key. The privacy amplification is a state at which security of the quantum key is enhanced by removing information leaked by a pirate listener at previous processes. Through this process, the length of the quantum key decreases in proportion to the influence of the pirate listener. The proof process should be performed together with all previous processes and checks whether the quantum key generation process is performed by the appointed transmitter and receiver, other than a third party such as a pirate listener.

In the quantum transmission process, the influence of a pirate listener may be stochastically minimized through quantum-mechanical characteristics by using a technique such as BB84, and simultaneously key information may be transmitted safely in comparison to classic security communication techniques. However, in the information reconciliation process through an open channel, the amount of leaked information varies depending on a used protocol, and the number of users of the open channel also gives a great influence on a quantum key generation rate. A cascade protocol and a winnow protocol are representative information reconciliation methods which have been studied until now. The cascade protocol corrects errors using a binary search technique and thus has low complexity, but this has a serious delay problem due to an excessive use of open channels. In addition, the winnow protocol solves the delay problem of the cascade protocol to some extent by using hamming codes to correct errors, but the error correcting process is performed inefficiently. In order to compensate such drawbacks of the bi-directional information reconciliation methods, many techniques have been studied, representatively an information reconciliation protocol using LDPC codes. This protocol may correct errors by using minimal open channels and also have high error correction ability. However, since a fixed amount of information leaks regardless of the quantum channel error rate in the error correction process, information unnecessarily leaks when a quantum channel has a low error rate. On the contrary, when a quantum channel has a high error rate, error correction may be failed due to insufficient error correction ability.

Literatures related to the present disclosure are as follows.

[Literature 1] C. Berrou, A. Glavieux, P. Thitimajshima, "Near shannon limit error—correcting coding and decoding: Turbo-codes(1)", In proc. IEEE Int'l Conf. on computers, pp. 1064-1070, May 1993.

Literature 1 proposes encoding and decoding structures of turbo codes. In addition, Literature 1 reveals that the turbo codes have excellent error correction ability along with LDPC codes in comparison to other error correction techniques.

[Literature 2] C. H. Bennett and G. Brassard, "Quantum cryptography: Public key distribution and coin tossing," in Proc. IEEE Int'l Conf. on Computers, Systems and Signal, 1984, pp. 175-179.

In Literature 2, basic concepts of the quantum key distribution theory are established, and study results of the BB84 technique for transmitting quantum photons are disclosed.

[Literature 3] G. Brassard, L, Salvail, "Secret key reconciliation by public discussion," Advances in Cryptology, Eurocypt '93, 1994, pp. 410-423.

Literature 3 proposes Cascade protocol used in public discussion. This is a technique for correcting errors of quantum keys by using a binary search technique.

[Literature 4] W. T. Buttler, S. K. Lamoreaux, J. R. Torgerson, G. H. Nickel, C. H. Donahue, and C. G. Peterson, "Fast, efficient error reconciliation for quantum cryptography," Phys. Rev. A, vol. 87, no. 052303, pp. 1-8, May 2003.

Literature 4 proposes Winnow protocol used in public discussion. This technique is a bi-directional protocol, similar to Cascade, to correct errors by using hamming codes, and the delay problem of Cascade protocol is solved to some extent.

[Literature 5] A. D. Livens, Z. Xiong, and C. N. Georghiades, "Compression of binary sources with side information at the decoder using LDPC codes," IEEE Commun. Lett., vol. 6, no. 10. pp. 440-442, October 2002.

Literature 5 proposes an information reconciliation protocol LDPC codes. This technique is a one-direction protocol for obtaining information about an error bit by using syndrome information of the LDPC codes, and also performs an error correction process based on the error bit.

[Literature 6] W. Y. Hwang, I. G. Koh, and Y. D. Han, "Quantum cryptography without announcement of bases," Phys. Lett. A, vol. 224, pp. 489-434, August 2003.

In Literature 6, the principle and effects of the quantum key expansion theory are analyzed. Literature 8 reveals that a transmitter and a receiver are able to expand a size of a quantum key as desired and also enhance the quantum key generation efficiency.

SUMMARY

An embodiment of the present disclosure is directed to providing an information reconciliation method using turbo codes over a quantum channel.

In one aspect of the present disclosure, there is provided an information reconciliation method in a quantum key distribution system between a transmitter and a receiver, which includes: generating a parity bit from a transmitter quantum key by using turbo codes; and transmitting the generated parity bit to the receiver through a quantum channel, wherein the parity bit is used by the receiver to correct an error of a receiver quantum key.

According to an embodiment of the present disclosure, the parity bit may be generated in a form of photon by using a photon base sequence generated from a random base sequence shared by the receiver and the transmitter.

According to an embodiment of the present disclosure, the random base sequence may be a security-guaranteed binary bit sequence, which corresponds to a photon base sequence according to a bit value.

According to an embodiment of the present disclosure, an error of the receiver quantum key may be corrected by the parity bit, and a residual error of the receiver quantum key may be removed through an open channel by using a cascade protocol so that the receiver quantum key is harmonized with the transmitter quantum key.

In another aspect of the present disclosure, there is provided an information reconciliation method in a quantum key distribution system between a transmitter and a receiver, which includes: receiving a parity bit from the transmitter through a quantum channel; correcting an error of a receiver quantum key by using the received parity bit; and removing a residual error of the receiver quantum key through an open channel by using a cascade protocol to harmonize the receiver quantum key with a transmitter quantum key, wherein the parity bit is generated at the transmitter by using turbo codes.

According to an embodiment of the present disclosure, the parity bit may be generated in a form of photon by the transmitter by using a photon base sequence generated from a random base sequence shared by the receiver and the transmitter.

According to the present disclosure, an advanced information reconciliation method may be applied to a quantum key distribution process to enhance quantum key generation efficiency. Different from existing information reconciliation methods in which only open channels are used, a quantum channel capable of detecting and preventing malicious influence of a pirate listener is also used as a channel for error correction to prevent information leakage of a quantum key. Therefore, it is possible to minimize an amount of leaked quantum key information, and a delay problem may also be solved.

DETAILED DESCRIPTION OF EMBODIMENTS

Figure 1:
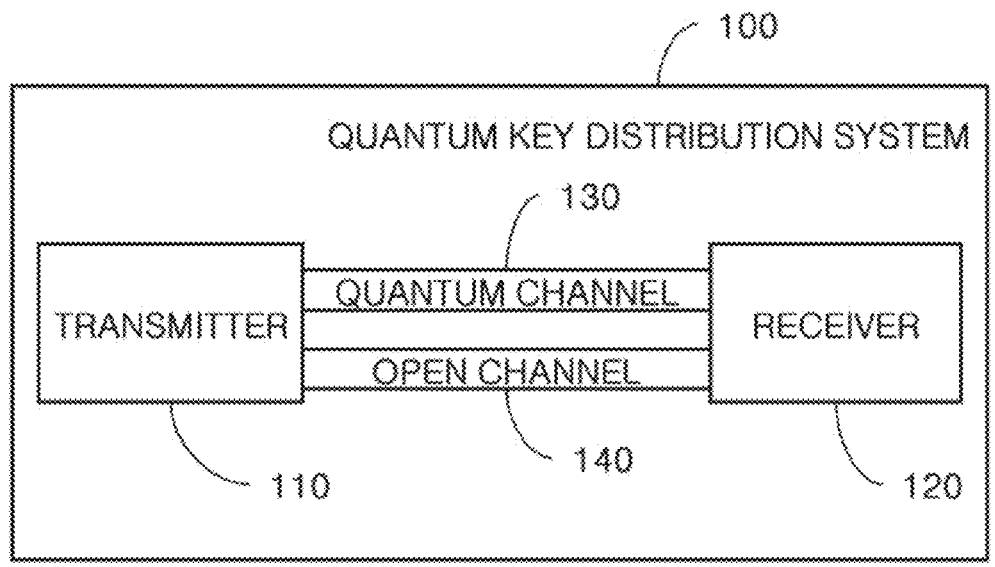
FIG. 1 is a block diagram showing a quantum key distribution system to which an information reconciliation method according to an embodiment of the present disclosure is applied.

Prior to the explanation of the present disclosure, solutions or technical spirit of the present disclosure will be summarized or essentially proposed for convenient understanding.

An information reconciliation method according to an embodiment of the present disclosure, in a quantum key distribution system between a transmitter and a receiver, includes: receiving a parity bit from the transmitter through a quantum channel; correcting an error of a receiver quantum key by using the received parity bit; and removing a residual error of the receiver quantum key through an open channel by using a cascade protocol to harmonize the receiver quantum key with a transmitter quantum key, wherein the parity bit is generated at the transmitter by using turbo codes.

Hereinafter, embodiments of the present disclosure, which can be easily implemented by those skilled in the art, are described in detail with reference to the accompanying drawings. However, these embodiments are just for better understanding of the present disclosure, and it will be obvious to those skilled in the art that the scope of the present disclosure is not limited to these embodiments.

The configuration of the present disclosure will be described in detail with reference to the accompanying drawings based on the embodiments of the present disclosure to clearly understand the solutions of the present disclosure. Here, when endowing reference numerals to components depicted in the drawings, the same reference numeral is given to the same component even though this component is depicted in different drawings, and when any drawing is explained, a component depicted in another drawing may also be cited, if necessary. Moreover, when explaining an operation principle of an embodiment of the present disclosure, detailed explanation of any known function or configuration related to the present disclosure or other matters may be omitted if it may unnecessarily make the essence of the present disclosure confused.

FIG. 1 is a block diagram showing a quantum key distribution system to which an information reconciliation method according to an embodiment of the present disclosure is applied.

A quantum key distribution system 100 to which an information reconciliation method according to an embodiment of the present disclosure is applied includes a transmitter 110, a receiver 120, a quantum channel 130, and an open channel 140.

Figure 4:
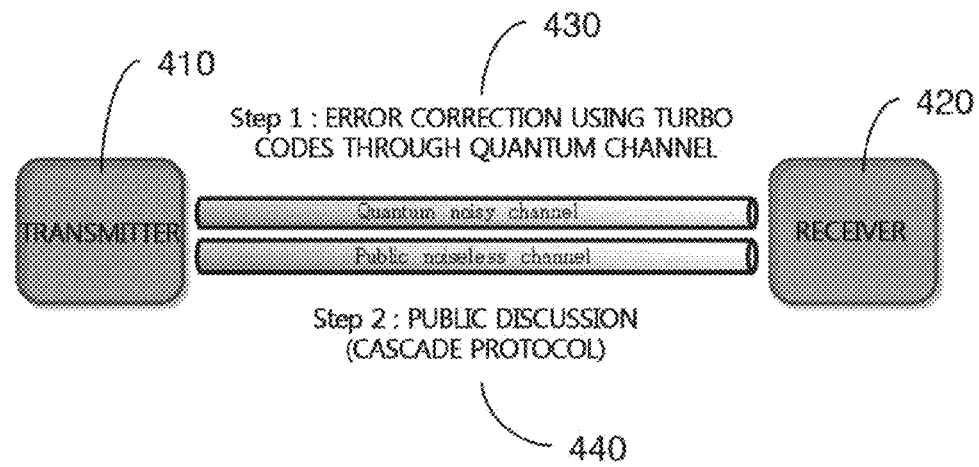
FIG. 4 shows a system model to which an information reconciliation method according to an embodiment of the present disclosure is applied.

For efficient information reconciliation, the transmitter 110 and the receiver 120 transmit or receive through the quantum channel 130 a parity bit generated by using turbo codes to correct an error, and removes a residual error through the open channel 140 by means of public discussion to perform information reconciliation. In other words, not only the open channel 140 but also quantum channel 130 is used for correcting an error to enhance efficiency of quantum key generation. A system model for the information reconciliation proposed in the present disclosure includes two processes in brief, as shown in FIG. 4. The first process is for correcting an error by using a quantum channel, and the second process is for performing information reconciliation by using an open channel.

In the first process for correcting an error, turbo codes are applied. An existing information reconciliation method using turbo codes is a one-directional technique with excellent error correction ability but has a limit in practice since a large amount of quantum key information leakage occurs while transmitting parity information. However, in the information reconciliation method according to the embodiment of the present disclosure, the amount of leaked quantum key information is minimized by transmitting parity information through a quantum channel.

Figure 5:
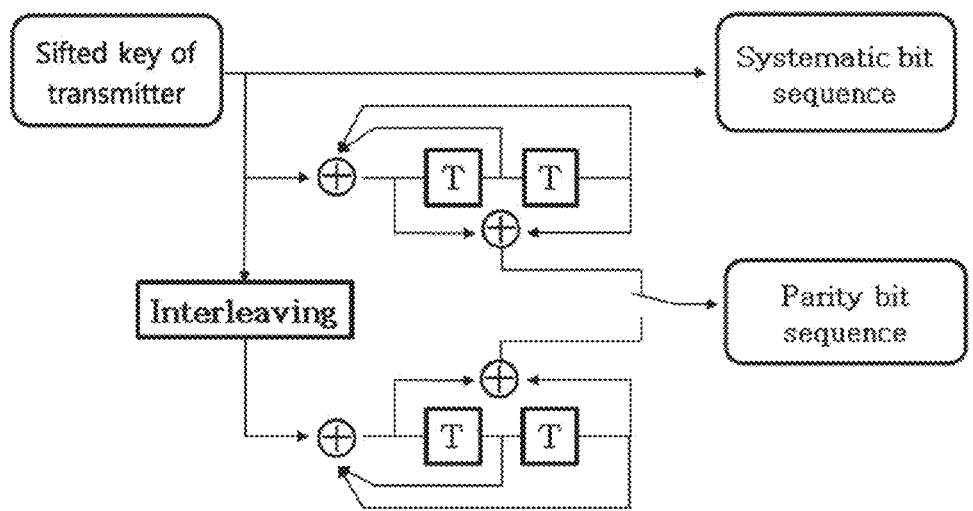
FIG. 5 shows a turbo encoder structure which is considered by the information reconciliation method according to an embodiment of the present disclosure.
Figure 6:
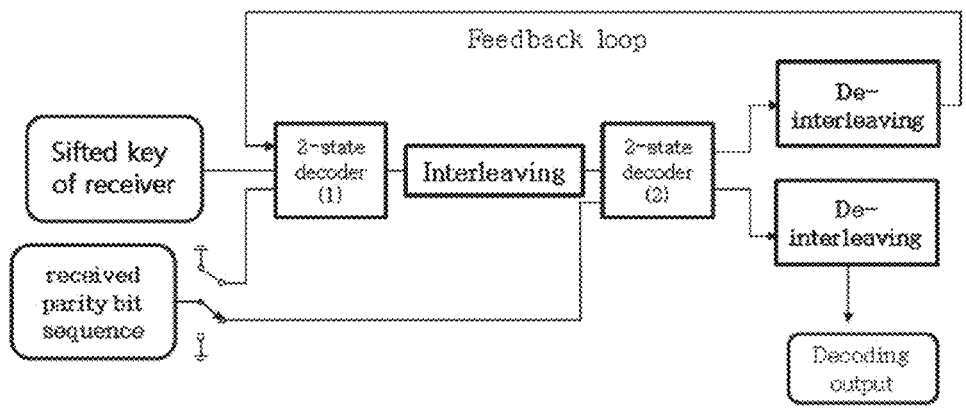
FIG. 6 shows a turbo decoder structure which is considered by the information reconciliation method according to an embodiment of the present disclosure.

FIGS. 5 and 6 show transmitting and receiving terminals in the error correcting process using turbo codes.

FIG. 5 shows a turbo code encoder which is configured with the same structure as used in an existing traditional communication system. An encoder input value is put into two convolutional encoders, where one input value is put as it is and the other input value is put after performing interleaving. In addition, two outputs are put at the output terminal and are composed of a systematic bit sequence identical to the input value and a parity bit sequence obtained by performing a puncturing process to two conventional outputs. At this time, in a turbo encoder of an existing traditional communication system, a message bit sequence is put as an input value to make two outputs, and two outputs are combined and transmitted to a receiver through a wireless channel. However, in the embodiment of the present disclosure, a filtered key of the transmitter is used as an input value. In addition, among two bit sequences generated at the output terminal, only the parity bit sequence is used and transmitted to the receiver through a quantum channel. At this time, the parity bit sequence is used for correcting an error of the receiver security key.

FIG. 6 shows a turbo code decoder which is configured with the same structure as used in an existing traditional communication system, similar to the encoder. Two kinds of information are input to an input terminal, and an error of the information is stochastically corrected by using 2-state decoders different from each other. In addition, this structure has a feedback loop and repeatedly performs the loop to correct an error with better reliability. An existing turbo decoder divides a transmitted encoded code word into two parts and puts them into an input part of a decoder, and recovers a message to be transmitted by a transmitter. However, the embodiment of the present disclosure uses a method different from the above. Two kinds of information are composed of a key possessed by the receiver and including an error and a parity bit sequence transmitted through a quantum channel. After completing the decoding process, an error of the filtered key of the receiver is corrected.

Figure 7:
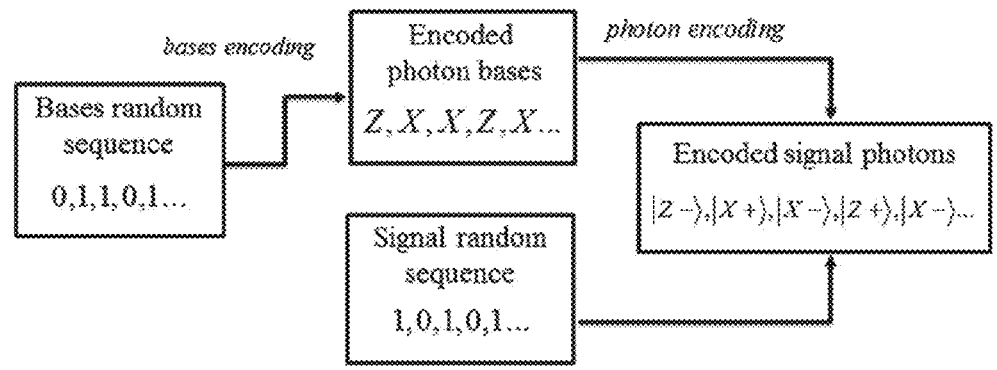
FIG. 7 is a diagram for illustrating a photon generation principle through a random base sequence used in the information reconciliation method according to an embodiment of the present disclosure.
Figure 8:
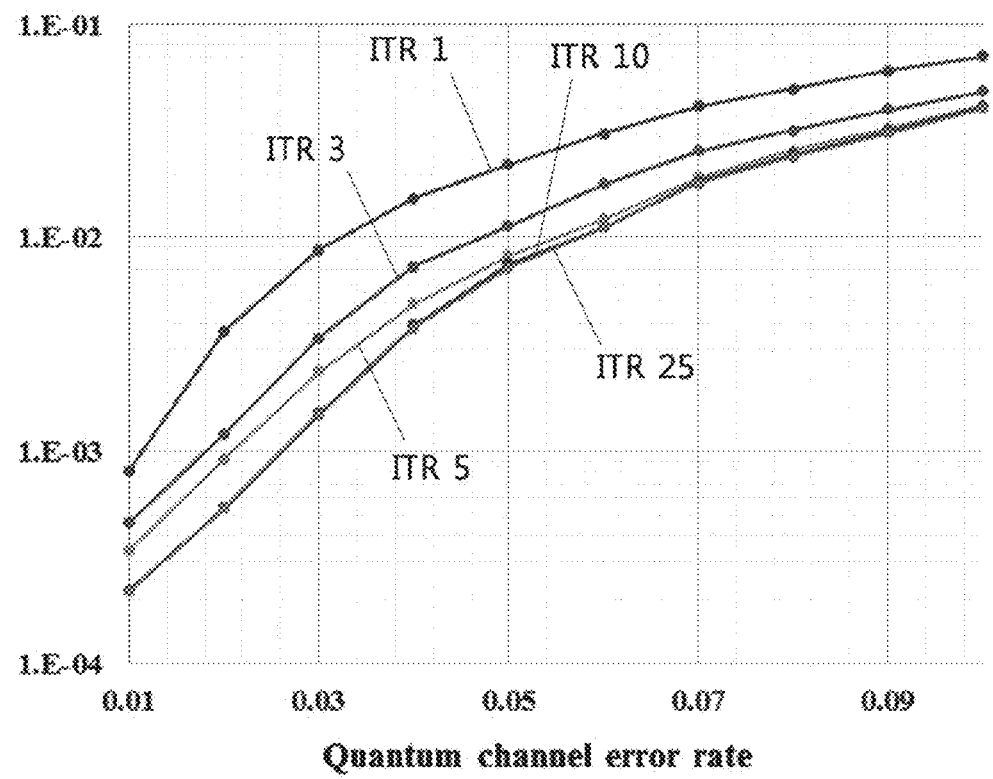
FIG. 8 is a diagram showing error correction ability according to iteration of turbo codes applied in the information reconciliation method according to an embodiment of the present disclosure.
Figure 9:
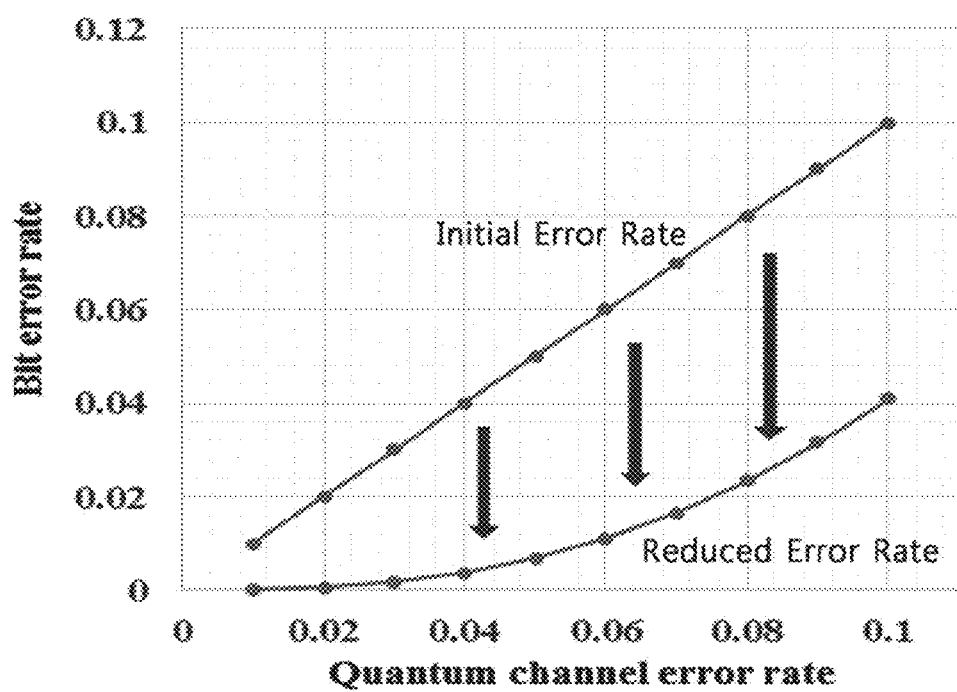
FIG. 9 shows an error rate change of a receiver quantum key after correcting errors by using the turbo codes.

If the transmitter and the receiver have quantum measurement bases different from each other during the error correcting process, a process of comparing the quantum measurement bases with each other must be performed after the transmission, similar to the BB84 protocol. The transmitter and the receiver randomly generate two kinds of measurement bases and encode and transmit quantum key information based on the measurement bases. At this time, stochastically, about 50% of quantum measurement bases may use the same base, but the other 50% may use different bases. Therefore, 50% of quantum measurement bases having different bases may not be used due to the quantum-mechanical principle. To solve this problem, the transmitter and the receiver shares random base sequences so as to use the same quantum measurement bases. The random base sequence represents a security-guaranteed binary bit sequence, which may correspond to a Z or X base according to a bit value. Based on the quantum photon base generated as above, the parity information may be efficiently transmitted to the receiver. The photon generating process is depicted in FIG. 7. At this time, since the parity information is transmitted through the quantum channel, the parity information is received together with a partial error bit due to an influence of a quantum channel error rate. Therefore, in comparison to a case where an error is corrected by using the information transmitted through an open channel, the error correction ability deteriorates slightly, but it has been found through simulation analyses that a desired goal is sufficiently achieved. FIG. 8 shows error correction ability according to the iteration number of turbo codes. In addition, FIG. 9 shows an error rate of the receiver quantum key after the primary error correction. As a result of the analysis, it can be found that the error rate is reduced by about 2.5 to 100 times depending on the quantum channel error rate.

Figure 10:
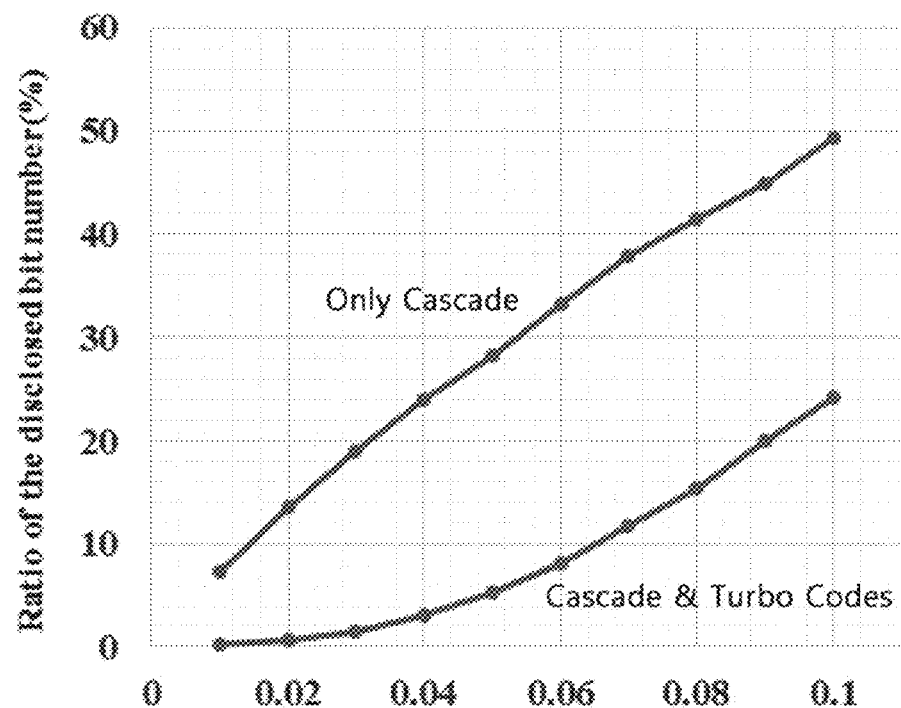
FIG. 10 shows a ratio of quantum key bits exposed when a cascade protocol is used solely and when the proposed technique is used.

After the primary error correction process is completed, public discussion using an open channel should be performed as a secondary process. In spite of excellent of error correction ability of the turbo codes in the primary process, a residual error may remain in the receiver quantum key. Further, even though all errors are entirely corrected not to leave a residual error, public discussion should be essentially performed to check the result. In the present disclosure, a residual error is removed by using a bi-directional cascade. Another kind of information reconciliation protocol may also be used. The cascade protocol has a drawback since it may cause a delay problem, but has excellent quantum key generation efficiency. In fact, the cascade protocol divides a quantum key bit sequence into small-sized block units and performs block-based error correction. The block size is set to be N=0.73/e, where e represents a quantum channel error rate, namely a bit error rate of a receiver quantum key. Therefore, since an error rate of the receiver quantum key is greatly reduced, an error may be corrected through a larger-size block, and the number of use of open channel may also greatly decrease. FIG. 10 shows a comparison result of a ratio of a quantum key bit when a cascade protocol is used solely as in an existing technique and a ratio of a quantum key bit when the protocol proposed in the present disclosure is used.

For the above operation, the transmitter may include a turbo encoder for generating a parity bit from a transmitter quantum key, a storage unit for storing the transmitter quantum key, and a communication unit for transmitting the generated parity bit to a receiver, and the receiver may include a communication unit for receiving a parity bit from a transmitter, an error correction unit for correcting an error of the receiver quantum key by using the parity bit, and an information reconciliation unit for reconciling information by means of public discussion by using a cascade protocol of an open channel. Detailed information reconciliation configurations of the transmitter 110 and receiver 120 will be described in detail below with reference to FIGS. 2 and 3.

Figure 2:
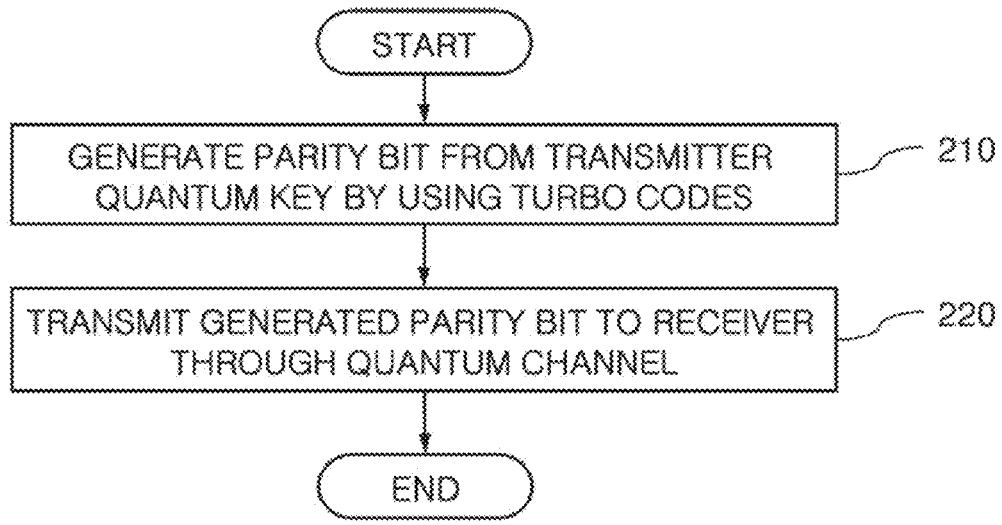
FIG. 2 is a flowchart for illustrating an information reconciliation method according to an embodiment of the present disclosure at a transmitter side.

FIG. 2 is a flowchart for illustrating an information reconciliation method according to an embodiment of the present disclosure at a transmitter side.

In Step 210, a parity bit is generated from a transmitter quantum key by using turbo codes.

In more detail, a parity bit is generated from the transmitter quantum key by using turbo codes. The transmitter quantum key is a sifted key. The parity bit is generated in a form of photon by using a photon base sequence generated from a random base sequence shared by the receiver and the transmitter. The random base sequence is a security-guaranteed binary bit sequence, which corresponds to a photon base sequence according to a bit value. As shown in FIG. 5, a parity bit is generated from a quantum key of the transmitter by using turbo codes. The generated parity bit is generated in a form of photon as shown in FIG. 7. In other words, a random base sequence is encoded to generate a photon base sequence, and the generated photon base sequence is used to generate a parity signal in a form of photon.

In Step 220, the generated parity bit is transmitted to the receiver through a quantum channel.

In more detail, the parity bit generated in Step 210 is transmitted to the receiver. The parity bit is used for the receiver to correct an error of the receiver quantum key. An error of the receiver quantum key is corrected by the parity bit, and a residual error of the receiver quantum key is removed by using a cascade protocol through an open channel to harmonize the receiver quantum key with the transmitter quantum key.

Figure 3:
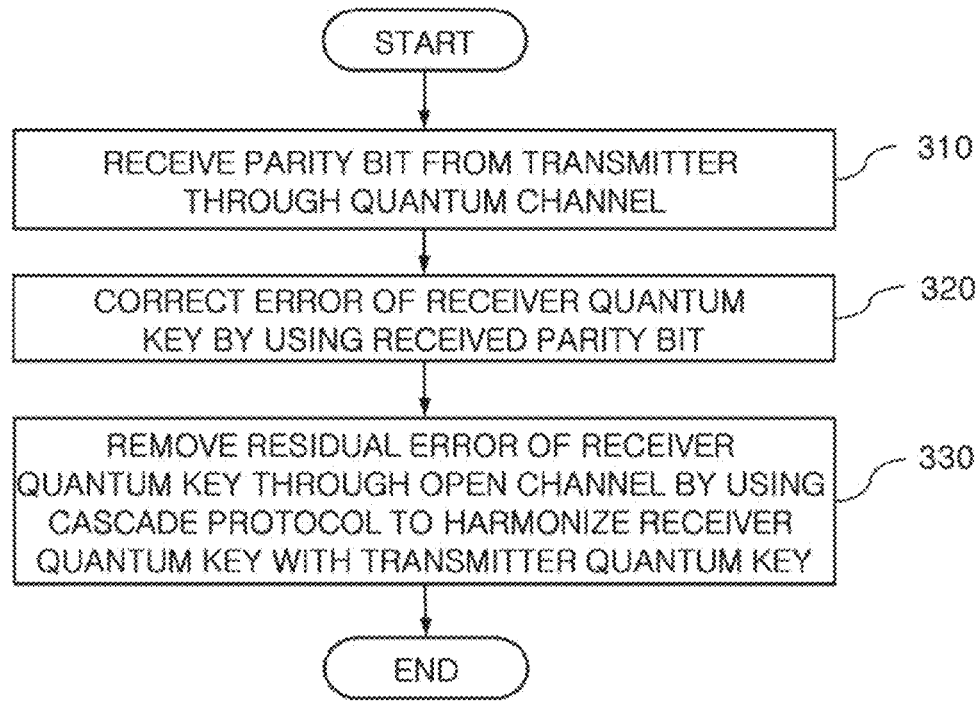
FIG. 3 is a flowchart for illustrating an information reconciliation method according to an embodiment of the present disclosure at a receiver side.

FIG. 3 is a flowchart for illustrating an information reconciliation method according to an embodiment of the present disclosure at a receiver side.

In Step 310, a parity bit is received from the transmitter through a quantum channel.

In more detail, a parity bit is received from the transmitter through a quantum channel, instead of an open channel. The parity bit is generated at the transmitter by using turbo codes.

The parity bit is generated in a form of photon by the transmitter by using a photon base sequence generated from a random base sequence shared by the receiver and the transmitter. The random base sequence is a security-guaranteed binary bit sequence, which corresponds a photon base sequence according to a bit value.

In Step 320, an error of the receiver quantum key is corrected by using the received parity bit.

In more detail, an error of the receiver quantum key is corrected by using the parity bit received in Step 310. The parity bit encoded at the transmitter by using turbo codes is decoded at the receiver by using turbo codes to correct an error of the receiver quantum key. The receiver quantum key is a sifted key.

In Step 330, a residual error of the receiver quantum key is removed through an open channel by using a cascade protocol to harmonize the receiver quantum key with the transmitter quantum key.

In more detail, when an error is corrected in Step 320, all errors may not be entirely removed. Therefore, a residual error of the receiver quantum key is removed through an open channel by using a cascade protocol to harmonize the receiver quantum key with the transmitter quantum key, thereby performing information reconciliation.

The embodiments of the present disclosure may be implemented as program commands executable by various kinds of computer means and recorded on a computer-readable recording medium. The computer-readable recording medium may include program commands, data files, data structures or the like solely or in combination. The program commands recorded on the medium may be specially designed or configured for the present disclosure or known to and available by computer software engineers. The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like. The program commands include not only machine codes made by a compiler but also high-level language codes executable by a computer by using an interpreter. The hardware device may be configured to operate as at least one software module to perform the operations of the present disclosure, or vice versa.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof.

Therefore, it is intended that this disclosure not be limited to the particular exemplary embodiments disclosed as the best mode contemplated for carrying out this disclosure, but that this disclosure will include all embodiments falling within the scope of the appended claims.

REFERENCE SYMBOLS

100: quantum key distribution system
110, 410: transmitter
120, 420: receiver
130, 430: quantum channel
140, 440: open channel

What is claimed is:

1. An information reconciliation method in a quantum key distribution system between a transmitter and a receiver, the method comprising:
    generating a parity bit from a transmitter quantum key by using turbo codes; and
    transmitting the generated parity bit to the receiver through a quantum channel,
    wherein the parity bit is used by the receiver to correct an error of a receiver quantum key, and
    wherein the receiver comprises a turbo code decoder which puts two kinds of information including a key possessed by the receiver and including an error and a parity bit sequence transmitted through the quantum channel into an input part.

2. The information reconciliation method according to claim 1,
    wherein the parity bit is generated in a form of photon by using a photon base sequence generated from a random base sequence shared by the receiver and the transmitter.

3. The information reconciliation method according to claim 2, wherein the random base sequence is a security-guaranteed binary bit sequence, which corresponds to the photon base sequence according to a bit value.

4. The information reconciliation method according to claim 1,
wherein an error of the receiver quantum key is corrected by the parity bit, and a residual error of the receiver quantum key is removed through an open channel by using a cascade protocol so that the receiver quantum key is harmonized with the transmitter quantum key.

5. An information reconciliation method in a quantum key distribution system between a transmitter and a receiver, the method comprising:
receiving a parity bit from the transmitter through a quantum channel;
correcting an error of a receiver quantum key by using the received parity bit; and
removing a residual error of the receiver quantum key through an open channel by using a cascade protocol to harmonize the receiver quantum key with a transmitter quantum key,
wherein the parity bit is generated at the transmitter by using turbo codes, and
wherein the receiver comprises a turbo code decoder which puts two kinds of information including a key possessed by the receiver and including an error and a parity bit sequence transmitted through the quantum channel into an input part.

6. The information reconciliation method according to claim 5,
wherein the parity bit is generated in a form of photon by the transmitter by using a photon base sequence generated from a random base sequence shared by the receiver and the transmitter.

7. The information reconciliation method according to claim 6,
wherein the random base sequence is a security-guaranteed binary bit sequence, which corresponds to the photon base sequence according to a bit value.

* * * * *